United States Patent
Hwang

(10) Patent No.: US 9,291,214 B2
(45) Date of Patent: Mar. 22, 2016

(54) HYDRAULIC SYSTEM FOR DOUBLE PISTON

(71) Applicant: Hyundai Motor Company, Seoul (KR)

(72) Inventor: Jin Young Hwang, Busan (KR)

(73) Assignee: Hyundai Motor Company, Seoul (KR)

( * ) Notice: Subject to any disclaimer, the term of this patent is extended or adjusted under 35 U.S.C. 154(b) by 607 days.

(21) Appl. No.: 13/718,887

(22) Filed: Dec. 18, 2012

(65) Prior Publication Data
US 2014/0083810 A1   Mar. 27, 2014

(30) Foreign Application Priority Data

Sep. 21, 2012 (KR) .................. 10-2012-0105318

(51) Int. Cl.
*F16D 25/0638* (2006.01)
*F16D 48/02* (2006.01)
*F16D 48/06* (2006.01)

(52) U.S. Cl.
CPC ............ *F16D 25/0638* (2013.01); *F16D 48/02* (2013.01); *F16D 48/062* (2013.01); *F16D 2048/0209* (2013.01); *F16D 2048/0212* (2013.01); *F16D 2048/0278* (2013.01)

(58) Field of Classification Search
CPC ............... F16D 25/0638; F16D 25/14; F16D 2048/0209; F16D 2048/0212; F16D 2048/0221; F16D 2048/0278
See application file for complete search history.

(56) References Cited

U.S. PATENT DOCUMENTS 5,439,088 A * 8/1995 Michioka et al. ........ 192/48.611
5,439,427 A * 8/1995 Enokido et al. ............... 477/130

* cited by examiner

*Primary Examiner* — Huan Le
(74) *Attorney, Agent, or Firm* — Morgan, Lewis & Bockius LLP

(57) ABSTRACT

A hydraulic system for a double piston includes a double piston that includes an operation piston with a first operation side and a second operation side, a first piston port for supplying hydraulic pressure to the first operation side, a second piston port for supplying hydraulic pressure to the second operation side, a solenoid valve that receives a clutch control pressure and communicates with the first piston port through a first channel, a switch valve that receives the clutch control pressure from the solenoid valve, may be connected with the second piston port through a second channel, and selectively transmits the clutch control pressure to the second piston port, and a manual valve that receives a line pressure and selectively transmits the line pressure to the switch valve such that the clutch control pressure may be selectively transmitted to the second operation side through the second channel.

14 Claims, 3 Drawing Sheets

HYDRAULIC SYSTEM FOR DOUBLE PISTON

CROSS-REFERENCE TO RELATED APPLICATION

The present application claims priority to Korean Patent Application No. 10-2012-0105318 filed on Sep. 21, 2012, the entire contents of which is incorporated herein for all purposes by this reference.

BACKGROUND OF THE INVENTION

1. Field of the Invention

The present invention relates to a hydraulic system for a double piston. More particularly, the present invention relates to a hydraulic system for a double piston without a solenoid valve for controlling a switch valve.

2. Description of Related Art

Recently, the one-way clutch connected with a low & reverse clutch used at a first forward speed range of a transmission is being gradually removed for enhancement of fuel consumption, reduction of weight, and reduction of cost.

In using a one-way clutch of the related art, there is little shift shock because mechanical shifting is possible by the one-way clutch without a specific limit in a low & reverse clutch in shifting with a large torque change such as 1→2 or 2→1, while it is required to precisely control the low & reverse clutch by removing the one-way clutch.

In general, the low & reverse clutch is used at the first forward speed range and a reverse speed range, and when there is a change in allotted torques of the first forward speed range and the reverse speed range, the allotted torques is set to the larger speed. In this case, it is more difficult to control precisely with a relatively small torque.

For example, when the allotted torque of the reverse speed range is larger in the allotted torques of the first forward speed range and the reverse speed range, the clutch allotted torques are set on the basis of the reverse speed range, such that an allotted torque larger than the necessary allotted torque is set for the first forward speed range.

Therefore, in general, when two shifting speeds are set by one clutch, a double piston structure is used, a switch valve is used to control the double piston valve, and a switch valve solenoid valve is necessary to operate the switch valve.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic system for a double piston having advantages of having a simple configuration and can be produced at low cost, by removing a solenoid valve for controlling a switch valve.

In an aspect of the present invention, a hydraulic system for a double piston, may include the double piston having an operation piston with a first operation side and a second operation side, a first piston port for supplying a first hydraulic pressure to the first operation side, and a second piston port for supplying a second hydraulic pressure to the second operation side, a solenoid valve that receives a clutch control pressure and communicates with the first piston port through a first channel, a switch valve that receives a portion of the clutch control pressure from the solenoid valve, is fluid-connected with the second piston port through a second channel, and selectively transmits the portion of the clutch control pressure to the second piston port, and a manual valve that receives a line pressure and selectively transmits the line pressure to the switch valve such that the portion of the clutch control pressure is selectively transmitted to the second operation side through the second channel.

The manual valve transmits the line pressure to the switch valve such that the portion of the clutch control pressure is transmitted through the second channel, when a predetermined shifting range is selected.

The predetermined shifting range is a reverse speed range.

The double piston may further include an inner spline, inner friction plates slidably disposed at the inner spline, an outer spline, outer friction plates slidably disposed at the outer spline and being alternate with the inner friction plates, and an elastic member that elastically supports the operation piston, and an operation rod, wherein the operation rod presses the inner friction plates and the outer friction plates, when the first hydraulic pressure is supplied to the first operation side, or the first hydraulic pressure is supplied to the first operation side and the second hydraulic pressure is supplied to the second operation side.

The operation piston is slidably mounted in the outer spline.

The elastic member is mounted onto the outer spline.

The switch valve may include an inlet port for receiving the portion of the clutch control pressure transmitted from the solenoid valve, an outlet port that communicates with the second channel, and a control port that communicates with the manual valve to receive the line pressure.

The switch valve may include a valve spool, and a spring elastically supporting the valve spool, and wherein the valve spool may include a first land that receives the line pressure through the control port, and a second land that selectively connects the inlet port with the outlet port, together with the first land.

The solenoid valve is a proportional control solenoid valve.

The double piston is operated as a low and reverse clutch.

In another aspect of the present invention, a hydraulic system for a double piston, may include the double piston that may have an inner spline, inner friction plates slidably disposed at the inner spline, an outer spline, outer friction plates slidably disposed at the outer spline to be alternate with the inner friction plates, an operation piston having a first operation side and a second operation side and selectively pressing the inner friction plates and the outer friction plates, an elastic member elastically supporting the operation piston, a first piston port for supplying a first hydraulic pressure to the first operation side, and a second piston port for supplying a second hydraulic pressure to the second operation side, a proportional control solenoid valve that receives a clutch control pressure and communicates with the first piston port through a first channel, a switch valve that receives a portion of the clutch control pressure from the solenoid valve, is connected with the second piston port through a second channel, and selectively transmits the clutch control pressure to the second piston port, and a manual valve that receives a line pressure and selectively transmits the line pressure to the switch valve such that the portion of the clutch control pressure is selectively transmitted to the second operation side through the second channel.

The operation piston is slidably mounted in the outer spline.

The elastic member is mounted onto the outer spline.

The manual valve transmits the line pressure to the switch valve such that the portion of the clutch control pressure is transmitted through the second channel, when a predetermined shifting range is selected.

The predetermined shifting range is a reverse speed range.

The switch valve has an inlet port for receiving the portion of the clutch control pressure transmitted from the solenoid valve, an outlet port that communicates with the second channel, and a control port that communicates with the manual valve to receive the line pressure, wherein the switch valve may include a valve spool, and a spring elastically supporting the valve spool, and wherein the valve spool may include a first land that receives the line pressure through the control port, and a second land that selectively connects the inlet port with the outlet port, together with the first land.

The double piston is operated as a low and reverse clutch.

According to a hydraulic system for a double piston of an embodiment of the present invention, a solenoid valve for controlling the switch valve is removed, such that the configuration is simple and the manufacturing cost can be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
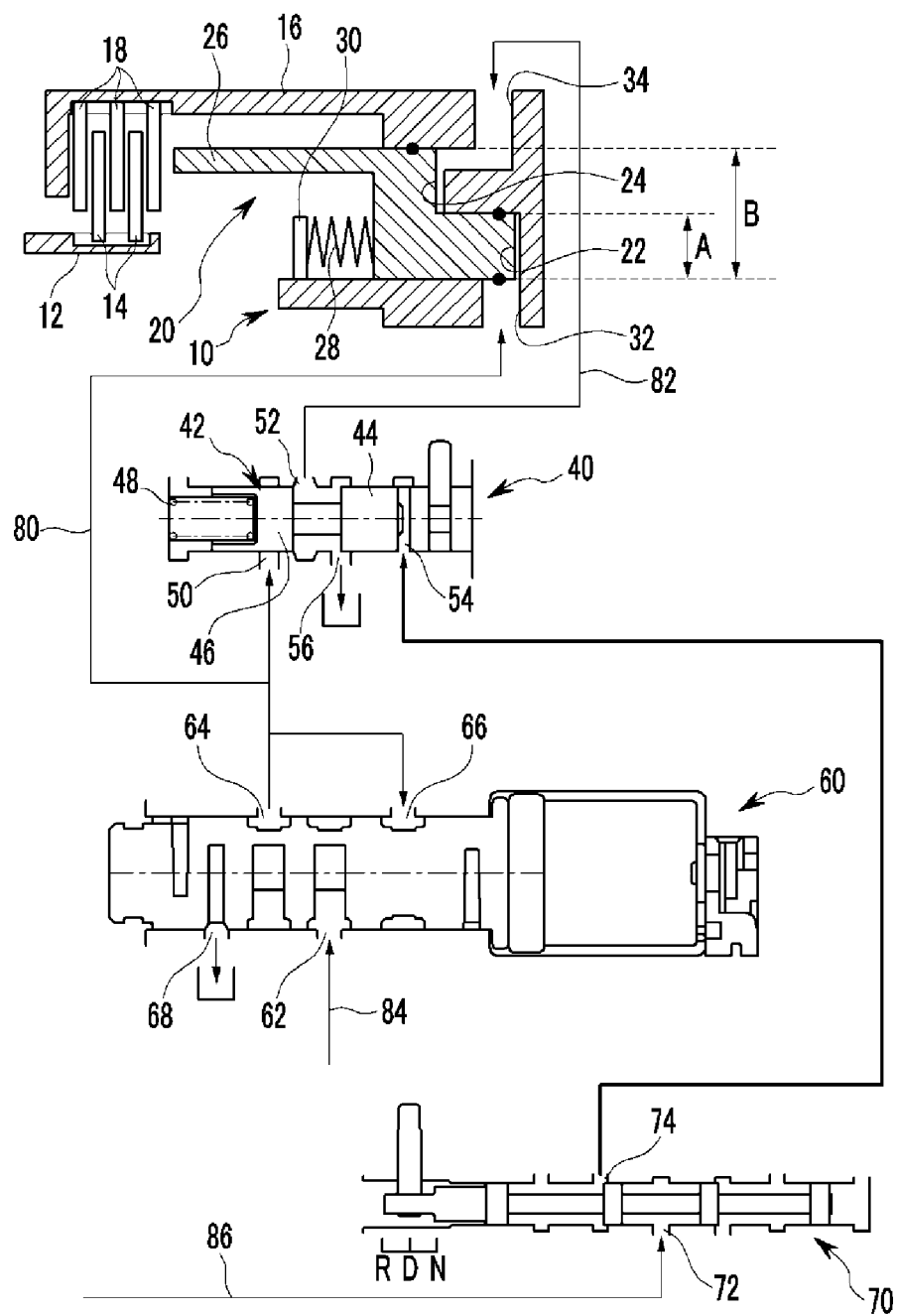
FIG. 1 is a view illustrating the operation in a first mode of a hydraulic system for a double piston according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention The parts indicated by like reference numerals mean the same components throughout the specification.

In the drawings, the thickness of layers, films, panels, regions, etc., are exaggerated for clarity.

In the present specification, the case in which it is represented that each part such as a layer, a film, an area, a plate, or the like, is "on" another part is intended to include not only the case in which each part is "directly on" another part but also the case in which the other part is between each part and another part.

In contrast, when an element is referred to as being "directly on" another element, there are no intervening elements present.

Throughout the specification, unless explicitly described to the contrary, the word "include" and variations such as "includes" or "including", will be understood to imply the inclusion of stated elements but not the exclusion of any other elements.

An exemplary embodiment of the present invention will hereinafter be described in detail with reference to the accompanying drawings.

Figure 2:
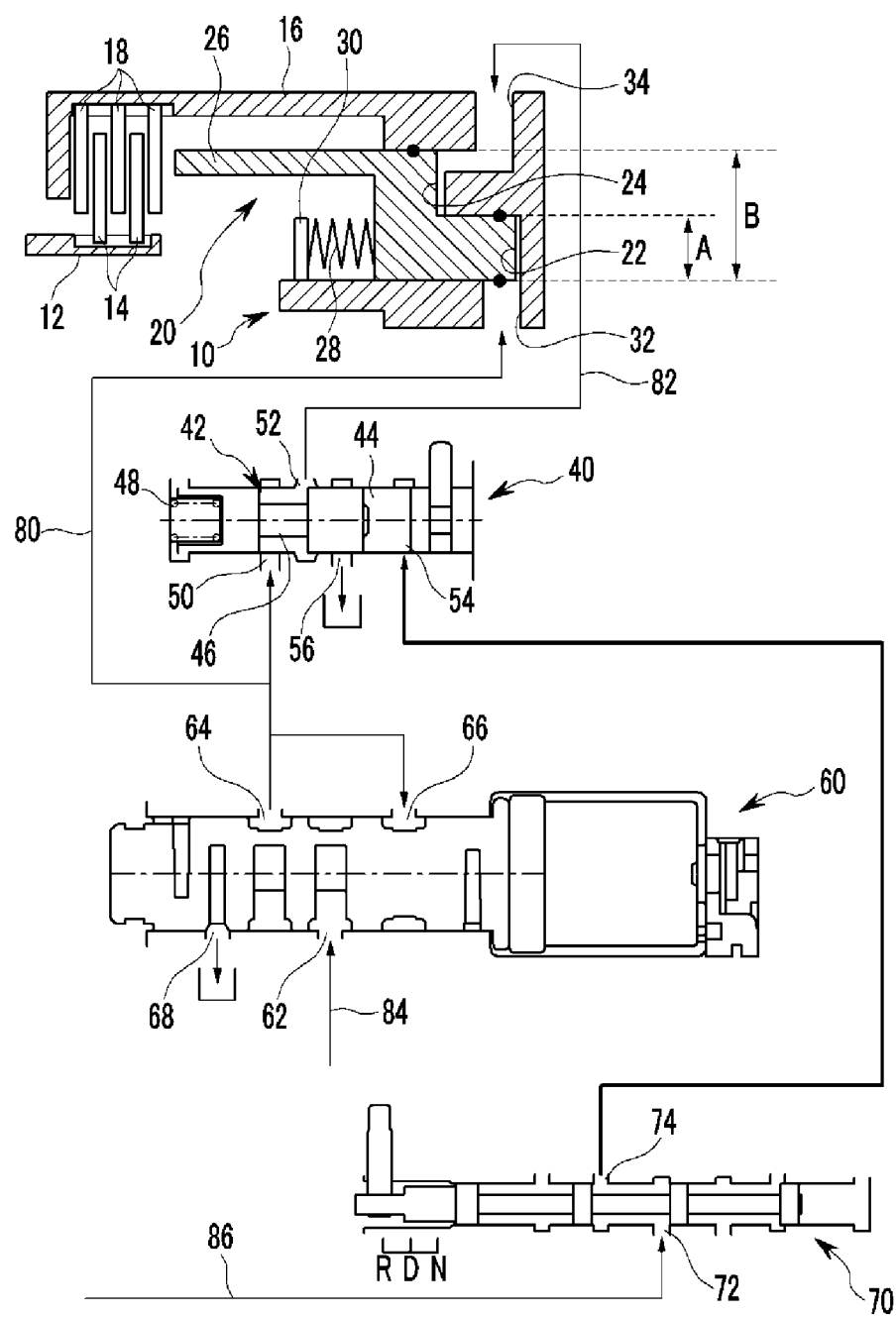
FIG. 2 is a view illustrating the operation in a second mode of the hydraulic system for a double piston according to an exemplary embodiment of the present invention.

FIG. 1 is a view illustrating the operation in a first mode of a hydraulic system for a double piston according to an exemplary embodiment of the present invention and FIG. 2 is a view illustrating the operation in a second mode of the hydraulic system for a double piston according to an exemplary embodiment of the present invention.

Referring to FIGS. 1 and 2, a hydraulic system for a double piston according to an exemplary embodiment of the present invention includes: a double piston 10 that includes an operation piston 20 with a first operation side 22 and a second operation side 24, a first piston port 32 for supplying hydraulic pressure to the first operation side 22, and a second piston port 34 for supplying hydraulic pressure to the second operation side 24, a solenoid valve 60 that receives a clutch control pressure and communicates with the first piston port 32 through a first channel 80, a switch valve 40 that receives the clutch control pressure from the solenoid valve 60, is connected with the second piston port 34 through a second channel 82, and selectively transmits the clutch control pressure to the second piston port 34, and a manual valve 70 that receives a line pressure and selectively transmits the line pressure to the switch valve 40 such that the clutch control pressure is selectively transmitted to the second operation side 24 through the second channel 82.

The double piston 10 includes an inner spline 12, inner friction plates 14 disposed at the inner spline 12, an outer spline 16, outer friction plates 18 disposed at the outer spline 16 to be alternate with the inner friction plates 14, and an elastic member 28 that elastically supports the operation piston 20.

The elastic member 28 is supported by a support 30 formed in the double piston 10.

An operation rod 26 that selectively presses the inner friction plates 14 and the outer friction plates 18 is formed at the operation piston 20, and presses the inner friction plates 14 and the outer friction plates 18, when hydraulic pressure is supplied to the first operation side 22, or to the first operation side 22 and the second operation side 24.

The manual valve 70 can transmit the line pressure to the switch valve 40 such that the clutch control pressure is transmitted through the second channel 82, when a predetermined shifting range is selected, in which the predetermined shirting range may be the reverse speed range.

The double piston 10 may be operated as a low & reverse clutch.

The switch valve 40 includes an inlet port 50 for receiving the clutch control pressure transmitted from the solenoid valve 60, an outlet port 52 that communicates with the second channel 82, and a control port 54 that communicates with the manual valve 70.

The switch valve 40 includes a valve spool 42 and a spring 48 elastically supporting the valve spool 42, and the valve spool 42 includes a first land 44 that receives the line pressure through the control port 54 and a second land 46 that selectively connects the inlet port 50 with the outlet port 52, together with the first land 44.

Further, the switch valve 40 has an exhaust port 56 for discharging surplus working oil.

The solenoid valve 60 may be a proportional control solenoid valve 60.

The solenoid valve 60 has first, second, third, and fourth solenoid ports 62, 64, 66 and 68 and the first solenoid valve port 62 receives a clutch hydraulic pressure transmitted through a clutch channel 84.

The second solenoid valve port 64 transmits the hydraulic pressure controlled by the solenoid valve 60, that is, the clutch control pressure to the first piston port 32 through the first channel 80 and simultaneously transmits the pressure to the switch valve 40 through the inlet port 50.

Some of the hydraulic pressure discharged through the second solenoid valve port 64 is fed back through the third solenoid port 66 and flows into the solenoid valve 60.

The fourth solenoid port 68 discharges the remainder of the hydraulic pressure flowing in the solenoid valve 60.

The operation and configuration of the solenoid valve 60 are apparent to those skilled in the art and thus the detailed description is will be omitted.

The manual valve 70 receives the line pressure, which is transmitted through the line pressure channel 86, through the line pressure input port 72 and selectively transmits the line pressure to the control port 54 through the line pressure exhaust port 74. That is, for example, when the manual valve 70 is at the D-range, the line pressure input port 72 does not communicate with the line pressure exhaust port 74, and when the manual valve 70 is at the R-range, the line pressure input port 72 communicates with the line pressure exhaust port 74 and the line pressure is transmitted to the control port 54.

Figure 3:
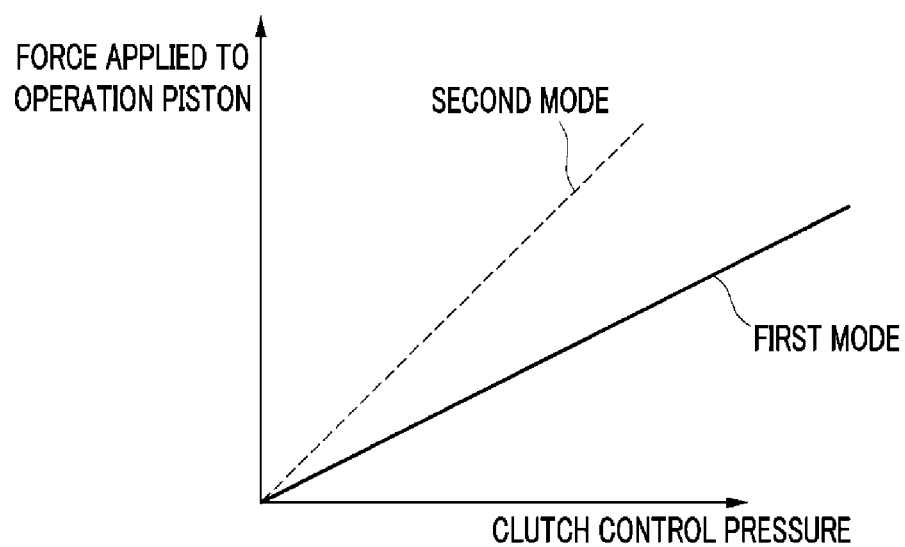
FIG. 3 is a graph illustrating the relationship between a force applied to an operation piston and a clutch control pressure of a hydraulic system for a double piston according to an exemplary embodiment of the present invention.

FIG. 3 is a graph illustrating the relationship between a force applied to an operation piston and a clutch control pressure of a hydraulic system for a double piston according to an exemplary embodiment of the present invention.

Hereinafter, the operation of the hydraulic system for a double piston according to an exemplary embodiment of the present invention is described with reference to FIGS. 1 to 3.

The first mode of FIG. 3 shows the relationship between the clutch control pressure and a force applied to the operation piston 20 when the clutch control pressure is transmitted to the first piston port 32 through the first channel 80 and the second mode shows the relationship between the clutch control pressure and a force applied to the operation piston 20 when the clutch control pressure is transmitted to the first piston port 32 and the second piston port 34 through the first channel 80 and the second channel 82.

The hydraulic system for a double piston according to an exemplary embodiment of the present invention controls the double piston in two modes, using the difference in force that is applied in accordance with a hydraulic pressure per unit operation area of the operation piston. That is, 'A' shown in FIGS. 1 and 2 indicates the operation area when the clutch control pressure is applied to the first operation side 22 and 'B' indicates the operation area when the clutch control pressure is applied to the first operation side 22 and the second operation side 24.

In general, the low & reverse clutch is used at the first forward speed range and the reverse speed range, and when there is a change in allotted torques of the first forward speed range and the reverse speed range, the allotted torques is set to the larger speed range. In this case, it is more difficult to control the speed range with a relatively small torque.

For example, when the allotted torque of the reverse speed range is larger in the allotted torques of the first forward speed range and the Reverse speed range, the clutch allotted torques are set on the basis of the Reverse speed range, such that an allotted torque larger than the necessary allotted torque is set for the first forward speed range.

Therefore, it is possible to improve the control ability by separately control the force that is applied to the operation piston, corresponding to the clutch control pressure, for each shifting range.

In the hydraulic system for a double piston according to an exemplary embodiment of the present invention, in the first mode, that is, at the D-range, the line pressure input port 72 does not communicate with the line pressure exhaust port 74. Therefore, the inlet port 50 is blocked by the second land 46 and the clutch control pressure discharged through the second solenoid port 64 is transmitted to the first piston port 32, such that the inclination the same as in the first mode is defined and the operation of the double piston 10 is controlled.

In the hydraulic system for a double piston according to an exemplary embodiment of the present invention, in the second mode, that is, at the R-range, the line pressure input port 72 and the line pressure exhaust port 74 of the manual valve 70 communicate with each other.

Therefore, the line pressure discharged through the line pressure exhaust port 74 is transmitted to the control port 54 of the switch valve 40.

Accordingly, the valve spool 42 of the switch valve 40 moves to the left in the figure and the inlet port 50 and the outlet port 52 are connected.

Therefore, the clutch control pressure discharged from the second solenoid port 64 of the solenoid valve 60 is transmitted to the first piston port 32 and the second piston port 34 through the first channel 80 and the second channel 82, such that the inclination the same as in the second mode is defined and the operation of the double piston 10 is controlled.

In the hydraulic system for a double piston according to an exemplary embodiment of the present invention, since the switch valve 40 can switch the channels that is connected to the second piston port 34 in accordance with the shifting mode of the manual valve 70, it is possible to remove a specific solenoid valve for operating the switch valve 40 and the entire system is simplified, therefore, it is possible to reduce the manufacturing cost.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic system for a double piston, comprising:
   the double piston including:
      an operation piston with a first operation side and a second operation side;
      a first piston port for supplying a first hydraulic pressure to the first operation side; and
      a second piston port for supplying a second hydraulic pressure to the second operation side;
   a solenoid valve that receives a clutch control pressure and communicates with the first piston port through a first channel;
   a switch valve that receives a portion of the clutch control pressure from the solenoid valve, is fluid-connected with the second piston port through a second channel, and selectively transmits the portion of the clutch control pressure to the second piston port; and
   a manual valve that receives a line pressure and selectively transmits the line pressure to the switch valve such that the portion of the clutch control pressure is selectively transmitted to the second operation side through the second channel,
   wherein the switch valve includes:
      an inlet port for receiving the portion of the clutch control pressure transmitted from the solenoid valve;
      an outlet port that communicates with the second channel;
      a control port that communicates with the manual valve to receive the line pressure;
      a valve spool; and
      a spring elastically supporting the valve spool, and
   wherein the valve spool includes:
      a first land that receives the line pressure through the control port; and
      a second land that selectively connects the inlet port with the outlet port, together with the first land.

2. The hydraulic system of claim 1, wherein the solenoid valve is a proportional control solenoid valve.

3. The hydraulic system of claim 1, wherein the double piston is operated as a low and reverse clutch.

4. The hydraulic system of claim 1, wherein the manual valve transmits the line pressure to the switch valve such that the portion of the clutch control pressure is transmitted through the second channel, when a predetermined shifting range is selected.

5. The hydraulic system of claim 4, wherein the predetermined shifting range is a reverse speed range.

6. The hydraulic system of claim 1, wherein the double piston further includes:
   an inner spline;
   inner friction plates slidably disposed at the inner spline;
   an outer spline;
   outer friction plates slidably disposed at the outer spline and being alternate with the inner friction plates; and
   an elastic member that elastically supports the operation piston, and
   an operation rod,
   wherein the operation rod presses the inner friction plates and the outer friction plates, when the first hydraulic pressure is supplied to the first operation side, or the first hydraulic pressure is supplied to the first operation side and the second hydraulic pressure is supplied to the second operation side.

7. The hydraulic system of claim 6, wherein the operation piston is slidably mounted in the outer spline.

8. The hydraulic system of claim 6, wherein the elastic member is mounted onto the outer spline.

9. A hydraulic system for a double piston, comprising:
   the double piston that includes:
      an inner spline;
      inner friction plates slidably disposed at the inner spline;
      an outer spline;
      outer friction plates slidably disposed at the outer spline to be alternate with the inner friction plates;
      an operation piston having a first operation side and a second operation side and selectively pressing the inner friction plates and the outer friction plates;
      an elastic member elastically supporting the operation piston;
      a first piston port for supplying a first hydraulic pressure to the first operation side; and
      a second piston port for supplying a second hydraulic pressure to the second operation side;
   a proportional control solenoid valve that receives a clutch control pressure and communicates with the first piston port through a first channel;
   a switch valve that receives a portion of the clutch control pressure from the solenoid valve, is connected with the second piston port through a second channel, and selectively transmits the clutch control pressure to the second piston port; and
   a manual valve that receives a line pressure and selectively transmits the line pressure to the switch valve such that the portion of the clutch control pressure is selectively transmitted to the second operation side through the second channel,
   wherein the switch valve has:
      an inlet port for receiving the portion of the clutch control pressure transmitted from the solenoid valve;
      an outlet port that communicates with the second channel;
      a control port that communicates with the manual valve to receive the line pressure,
      a valve spool; and
      a spring elastically supporting the valve spool, and
   wherein the valve spool includes:
      a first land that receives the line pressure through the control port; and
      a second land that selectively connects the inlet port with the outlet port, together with the first land.

10. The hydraulic system of claim 9, wherein the operation piston is slidably mounted in the outer spline.

11. The hydraulic system of claim 9, wherein the elastic member is mounted onto the outer spline.

12. The hydraulic system of claim 9, wherein the double piston is operated as a low and reverse clutch.

13. The hydraulic system of claim 9, wherein the manual valve transmits the line pressure to the switch valve such that the portion of the clutch control pressure is transmitted through the second channel, when a predetermined shifting range is selected.

14. The hydraulic system of claim 13, wherein the predetermined shifting range is a reverse speed range.

* * * * *

UNITED STATES PATENT AND TRADEMARK OFFICE
CERTIFICATE OF CORRECTION

| | | |
|---|---|---|
| PATENT NO. | : 9,291,214 B2 | Page 1 of 1 |
| APPLICATION NO. | : 13/718887 | |
| DATED | : March 22, 2016 | |
| INVENTOR(S) | : Jin Young Hwang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 614 days.

Signed and Sealed this
Ninth Day of August, 2016

Michelle K. Lee
*Director of the United States Patent and Trademark Office*